United States Patent [19]

Schrader

[11] 4,435,054
[45] Mar. 6, 1984

[54] FILM GUIDE ASSEMBLY

[76] Inventor: Hellmut Schrader, Am Hüttenkrug 12, D-3057 Neustadt 1, Fed. Rep. of Germany

[21] Appl. No.: 361,972

[22] Filed: Mar. 25, 1982

[51] Int. Cl.³ ............................................. G03B 21/16
[52] U.S. Cl. ........................................ 353/95; 353/60
[58] Field of Search ................. 353/95, 96, 97, 23, 353/60, 61; 352/221, 224, 227; 354/203

[56] References Cited

U.S. PATENT DOCUMENTS

| 1,298,393 | 3/1919 | Proctor | 352/227 |
| 1,889,084 | 11/1932 | Wright | 353/95 X |
| 2,229,924 | 1/1941 | Howell | 352/224 |
| 2,292,966 | 8/1942 | Osterberg et al. | |
| 2,598,364 | 5/1952 | D'Avitaya | |
| 2,981,146 | 4/1961 | Kipping | |
| 3,102,448 | 9/1963 | Hammer | 353/95 X |
| 3,627,411 | 12/1971 | Nagel | 353/95 X |
| 3,823,891 | 7/1974 | Schrader | |
| 4,257,695 | 3/1981 | Longworthy | 353/95 |
| 4,258,987 | 3/1981 | Nishikawa et al. | 353/95 |

FOREIGN PATENT DOCUMENTS

| 892551 | 10/1953 | Fed. Rep. of Germany |  |
| 2450417 | 4/1976 | Fed. Rep. of Germany | 353/60 |
| 884192 | 4/1943 | France | 352/224 |
| 940421 | 5/1948 | France |  |
| 38-11090 | 7/1963 | Japan | 352/224 |
| 328662 | 4/1958 | Switzerland |  |

Primary Examiner—Harry N. Haroian
Attorney, Agent, or Firm—Spencer & Frank

[57] ABSTRACT

A film guide assembly for a film viewing device which projects an image provided on a film. The assembly includes a film transporting path having a window disposed therein for the delimitation of the edges of the image on the film and for defining the position of the film, the width of the opening of the window transverse to the direction of the film transporting path being smaller than the width of the film transporting path. The film guide assembly further includes first and second frame members which are arranged one behind the other in the direction of the travel of light through the window and enclose between them the film transporting path. The first frame member contacts the edges of the film and defines a contact plane which includes the window plane determinative for the sharpness of the projected image. The second frame member has a projection which projects in the direction of the contact plane defined by the first frame member.

8 Claims, 8 Drawing Figures

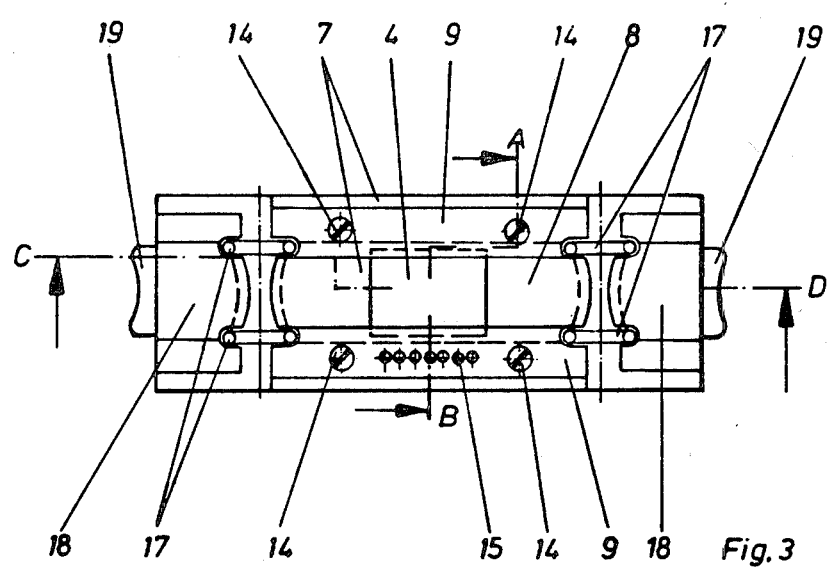
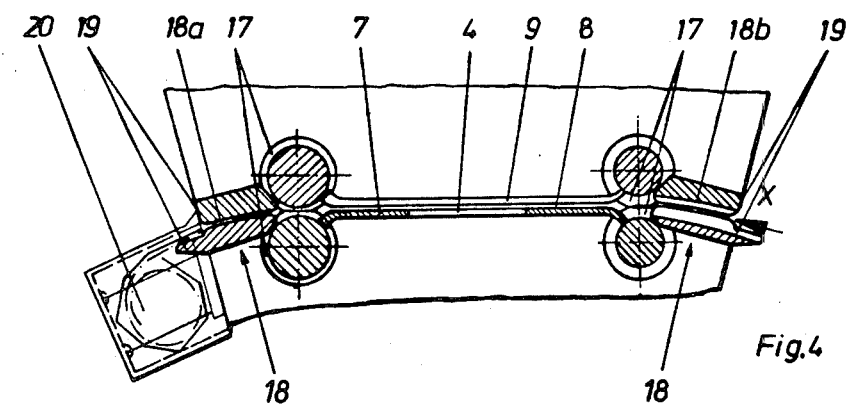
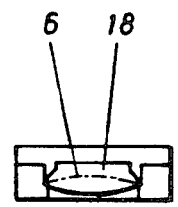

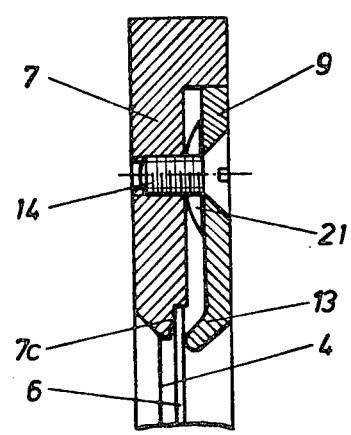
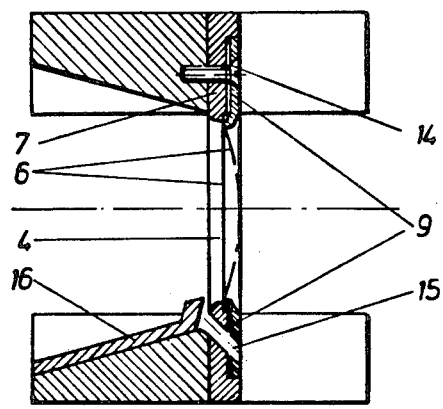
Fig. 6  Fig. 7
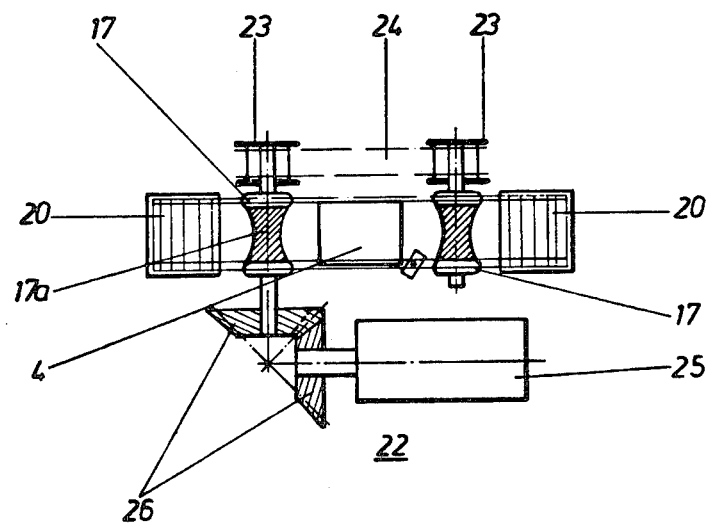
Fig. 8

FILM GUIDE ASSEMBLY

BACKGROUND OF THE INVENTION

The present invention relates to a film guide, particularly for film viewers, editors, projectors or the like, which includes a window for defining the edges of the image and defining the position of the film, the opening width of the window transverse to the film transporting direction being smaller than the width of the film transporting path. Such windows have a defined position with respect to the lens and cause the window plane or the film contacting it, respectively, to be reproduced in sharp focus on the viewing or projection screen.

When dimensioning the lens of a projector, the fact must be considered that the transported film has an unavoidable curvature which is caused by the layer bearing the image. Particularly with slides, where the light acts longer on one picture, the heat emanating from the light source acts on the film for a corresponding length of time and produces an additional curvature or a change in the depth of the curvature.

In order to assure a sharp projected or viewed image, the lenses in known devices are dimensioned to take into account the largest occurring curvature of the film, in order to provide a great depth of focus for the varying curvature of quickly moving slide film. The result of this is that, particularly with projectors, the projected image is relatively small compared to the distance of the projector from the screen, due to the large focal length required to obtain the great depth of focus. Despite the substantial adaptation resulting from making the focal length of the lens correspond to the greatest occurring curvature of the film, the focus must often be readjusted in conventional projectors presently available because with slides which are not glass, the maximum occurring curvature may be even greater than provided for, depending on the quality of the framing job.

SUMMARY OF THE INVENTION

It is an object of the present invention to provide a film guide assembly for film viewers, projectors or the like in which, despite the unavoidable curvature or changes in the curvature of the film, sufficient sharpness of focus of the image can be realized even if the focal length is selected to be smaller than usual to obtain a larger image relative to the distance of the device from the screen.

According to a preferred embodiment of the invention the film guide assembly includes a film transporting path having a window disposed therein which delimits the edges of the image on the film as well as the position of the film. The width of the opening of the window transverse to the direction of the film transporting path is smaller than the width of the film transporting path. First and second frame members are disposed one behind the other and enclose between them the film transporting path. The first frame member contacts the edges of the film and defines a contact plane which comprises the window plane determinative for the sharpness of the projected image. The second frame member has a projection which projects in the direction of the contact plane defined by the first frame member.

These and other objects and advantages will become apparent from the following detailed description taken in conjunction with the accompanying drawings, and the novel features will be particularly pointed out in the appended claims.

BRIEF DESCRIPTION OF THE DRAWINGS

FIG. 3 is an elevational view onto the plane of the picture window in the film guide assembly in FIG. 1.

FIG. 4 is a sectional view of FIG. 3 along line C–D.

FIG. 5 is a view of a detail of FIG. 4.

FIGS. 6, 7 and 8 are detail views of various components and parts used in the invention.

DESCRIPTION OF THE PREFERRED EMBODIMENTS

Figure 1:
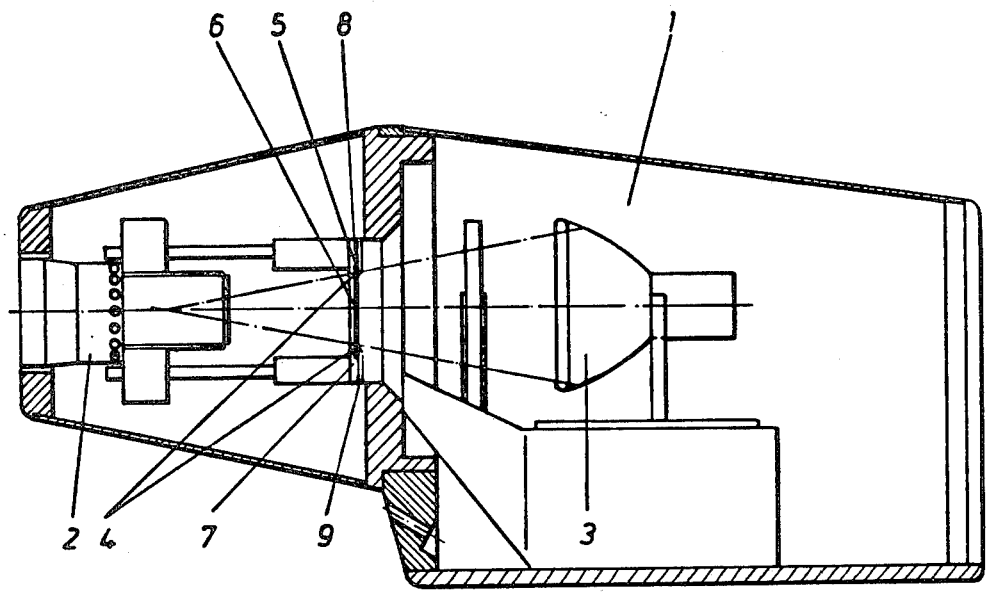
FIG. 1 is an elevational view, partly in cross section, of a projector with a film guide assembly in accordance with a preferred embodiment of the invention.

FIG. 1 shows a projector 1 with its lens 2 and light source 3 in which a window 4 is disposed between the lens 2 and the light source 3. The window 4 is surrounded by a fixed frame member 7 having upper and lower frame member parts 7a and 7b (FIG. 2) which serve as an abutment for the edges 5 of a film 6 that is transported perpendicularly to the plane of the drawing. The width of the opening in the frame member 7 is smaller than the width of the transporting path 8 for the film 6 by such an amount that the film 6 contacts frame members 7a and 7b only with its edges 5. The width of the transporting path 8 is equal to, or insignificantly larger than, the width of the film 6. The width of the frame member opening, i.e. the distance between the frame member parts 7a and 7b, is equal to or greater than the width of the image bearing portion of the film so that the window simultaneously delimits the viewing field.

The relative position of the film 6 with respect to the lens 2 is essentially given and defined by the contact of the film edges 5 at the frame member parts 7a and 7b. In the prior art, the unavoidable curvature caused by the film layer on one side of the film 6 is not taken into account when defining the position in the region of the window 4. In the prior art projectors this problem was addressed, for example, by appropriately dimensioning the focal length of the lens. However, that results in a relatively small picture. In the present invention an additional frame member 9, having upper and lower frame member parts 9a and 9b (FIG. 2), is provided which produces a reduction of the depth of the curvature in the area of the film edges 5.

Figure 2:
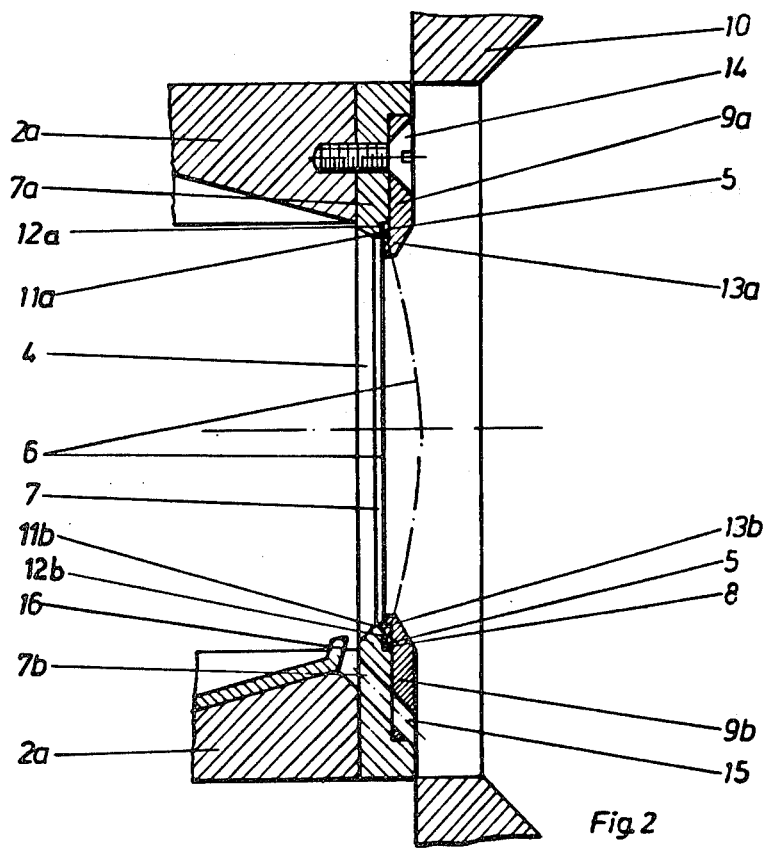
FIG. 2 is a sectional view of the film guide assembly in the projector shown in FIG. 1.

FIG. 2 shows in greater detail the region of the projector which has been modified according to the invention, with the film transporting direction lying perpendicular to the plane of the drawing. Parts 2a, 2b of the projector 1 support the lens 2 (not shown) and seal in frame member parts 7a, 7b against the light source housing 10. The frame member parts 7a, 7b are each provided with a projection 11a, 11b which are dimensioned to serve as an abutment of the film 6 which is depicted both by a dotted line showing the uncorrected curvature and by a full line showing the corrected position afforded by the invention herein. The projections 11a, 11b and recesses 12a, 12b in frame member parts 7a, 7b define the film transporting path 8 in the area of the picture window 4. The distance between the two frame member parts 7a and 7b, which preferably are made of one piece with the frame member 7, is selected to be equal to, or greater than, the film layer of the film 6 so that no part of the image to be reproduced is covered. Frame member parts 7, 7a, 7b may also be manufactured individually and combined into a unit when in the projector.

The additional frame member 9 is disposed on the side facing the light source 3. It is given such an opening width that it is likewise unable to cover parts of the image to be reproduced. For this purpose, the frame member parts 9a, 9b are each provided with projections 13a, 13b which project in the direction toward the plane defined by the frame member 7 and pushes the film 6 in the direction toward the window. The projections 13a and 13b are given such an elongate shape that distortion or damage to the film 6 is impossible. This reduces the curvature in the film 6 or even eliminates it.

Screws 14 serve to fasten the second frame member 9 to the first frame member 7. The projections 13a, 13b are adjustable by means of screws 14. If required a plurality of corresponding screws may be provided.

The projections 11a, 11b of the frame member parts 7a, 7b may be dimensioned so much shorter than the projections 13a, 13b that the curvature can be compensated or over-compensated. The shorter dimension of the projection 11a, 11b make such compensation possible because the film can be bent by the projection 13a, 13b toward and beyond the plane of contact of the frame member 7. If the projections 11a, 11b and 13a, 13b had the same length with respect to their extent toward the picture window 4 or if the projection 13a, 13b were somewhat shorter than 11a, 11b, the film could be bent maximally only to the plane of contact and could perhaps even be pressed tight there.

FIG. 3 is a view onto the film guide assembly looking from the direction of the light source 3 in which it can be seen that the window 4 is bordered by the one piece frame member 7, and is positioned in the film transporting path 8. FIG. 4 which is a sectional view along line C-D of the film guide shown in FIG. 3 also corresponds to this part of the description. Film transporting rollers 17 are included in the film transporting path 8. Outside the area of the window 4, the film 6 extending between the frame members 7, 9 thus moves into film guide members 18 each having a film guide path 18a and 18b, as disclosed, for example, in German Patent Application P 2509721. Each film guide member 18 is provided at its outer end with a receptacle device 19 to which can be fastened or hooked a film cassette 20, shown in FIG. 8, as they are disclosed in German patent application No. P 2155521.

FIG. 5 is an end view of a receiving device, viewed in the direction x of FIG. 4. The upper portion is designed in such a way that even a greatly curved film will have no real contact. With a film viewer supplemented by such measures it is possible to thread a slide film 6, directly from the cassette 20 via a dust-protected film guide path 18a by means of drive rollers 17 which act on the edges of the film in an engaging manner to transport the film through the film guide path 18a, past the window region 4 and through corresponding film guide path 18b with or without film driving rollers, into an empty cassette (not shown). The film drive and the position of the lens can be controlled as a structural unit by means of a remote control device.

FIG. 6 shows a further feature of the adjustment device for the frame member 9. The connection between the two frame members 7 and 9 is designed in such a manner that the second frame member 9 is adjustably connected with the first frame member 7. Between the spaced frame members 7 and 9 there is disposed a spring 21, preferably a plate spring, rubber spring or the like. The frame member 7 has an inner edge 7c which is sloped to facilitate adjustment and improve slideability of the film. The sloped face of edge 7c has an additional friction reducing effect in that, because of the overcompensation of the curvature, the film contacts frame member parts only slightly. The projection 13 is thus adjustable with respect to its distance from the plane of contact, without at the same time making this projection unstable.

Both frame members 7, 9 are provided, according to FIG. 7 (section along line A-B of FIG. 3) with one or a plurality of ventilating channels 15 which cool the film directly or via deflecting members 16 in the region of the window 4 from the side of the lens.

FIG. 8 shows a drive 22 for the rollers 17 which each have a concave roller surface shaft 17a, the drive comprising a toothed belt 23, toothed pulley wheels 24 and a motor 25 (or crank). Instead of the illustrated bevel gears 26, a worm gear drive can also be used. The concave configuration of the drive surfaces 17a has the advantage that the transition for the film 6 is a sliding one and the film edges cannot abut anywhere.

The present invention also makes it possible for slides to be displayed from unmounted parts of long uncut rolls of film instead of from individual glass-mounted slides. This provides for miniaturized storage.

As can be seen in FIGS. 3, 4 and 8, the members 7, 9, 18 are adapted to the shape of the drive rollers and this produces a shock-free transition of the film 6 from the film guide member 18 to the rollers 17 and vice versa.

It will be understood that various changes in the details, materials and steps which have been described herein to explain the nature of the invention may be made by those skilled in the art within the principle and scope of the invention as expressed in the appended claims.

What is claimed is:

1. In a film guide assembly for a film viewing device which projects an image provided on a film having parallel edges, the assembly comprising means for defining a film transporting path having a window disposed therein for the delimitation of the edges of the image on the film and for defining the position of the film, the width of the opening of the window transverse to the direction of the film transporting path being smaller than the width of the film transporting path, and means disposed in the viewing device for directing light through the window, the improvement wherein said film guide assembly further comprises first and second frame members which are arranged one behind the other in the direction of the travel of light through said window and enclose between them said film transporting path, said first frame member being located to contact the edges of the film and defining a contact plane which comprises the window plane determinative for the sharpness of the projected image, said second frame member having first and second projecting parts each disposed to extend along a respective one of the edges of the film, delimiting the corresponding edges of said second frame member, projecting in the direction of said contact plane defined by said first frame member and located for pushing the film toward said contact plane across the entire extent of said window in the direction of said transporting path, said first and second frame members defining an opening having at least one dimension at least equal to the corresponding dimension of the film area utilized for projection of the image, and the opening width transverse to the direction of film transporting of said first frame member being greater than the corresponding opening width of said second frame member.

2. A film guide assembly as defined in claim 1 wherein said projecting parts of said second frame member define said opening of said second frame member.

3. A film guide assembly as defined in claim 1 wherein the distance between a respective one of said projecting parts of said second frame member and said plane of contact defined by said first frame member essentially corresponds to the thickness of the film.

4. A film guide assembly as defined in claim 1 wherein the distance between a respective one of said projecting parts of said second frame member and said plane of contact defined by said first frame member is adjustable.

5. A film guide assembly as defined in claim 4 further comprising at least one spring disposed between said frame members.

6. A film guide assembly as defined in claim 1 wherein said frame members are provided with ventilation channels through which the side of said window facing away from the direction of passage of said light is ventilated.

7. A film guide assembly as defined in claim 6 further comprising deflecting members associated with said ventilating channels.

8. A film guide assembly as defined in claim 1, wherein said projection parts have an elongate shape across the entire extent of said window in the direction of said film transporting path and said first member and said projection parts coöperate to reduce a curvature in the film transverse to the direction of said transporting path.

* * * * *